(12) United States Patent
Exner

(10) Patent No.: US 9,206,856 B2
(45) Date of Patent: Dec. 8, 2015

(54) COUPLING

(71) Applicant: Jochen Exner, Hennef (DE)

(72) Inventor: Jochen Exner, Hennef (DE)

(73) Assignee: CENTA-ANTRIEBE KIRSCHEY GMBH, Haan (DE)

( * ) Notice: Subject to any disclaimer, the term of this patent is extended or adjusted under 35 U.S.C. 154(b) by 0 days.

(21) Appl. No.: 14/171,924

(22) Filed: Feb. 4, 2014

(65) Prior Publication Data

US 2014/0228131 A1    Aug. 14, 2014

(30) Foreign Application Priority Data

Feb. 12, 2013  (DE) .................... 10 2013 002 253
Mar. 11, 2013  (DE) .................... 10 2013 004 090

(51) Int. Cl.
*F16D 3/62*   (2006.01)
*F16D 3/60*   (2006.01)

(52) U.S. Cl.
CPC ........................................ *F16D 3/60* (2013.01)

(58) Field of Classification Search
CPC ........................................................ F16D 3/60
USPC ........................................ 464/69, 86, 97, 904
See application file for complete search history.

(56) References Cited

U.S. PATENT DOCUMENTS 2,380,672 A * 7/1945 Opitz ........................... 464/69 X
4,019,346 A * 4/1977 Fukuda ....................... 464/69 X
4,439,168 A   3/1984 Orain
5,186,686 A * 2/1993 Staples et al. .................. 464/69
8,784,219 B2 * 7/2014 Exner et al. .................. 464/904
2013/0040742 A1  2/2013 Exner

FOREIGN PATENT DOCUMENTS

DE    4205666 A    9/1993

OTHER PUBLICATIONS

Universal Joint and Driveshaft Manual, AE-7, Society of Automotive Engineers, Inc., Warrendale,PA, pp. 131-140, TJ1072.S62 1979.*

* cited by examiner

*Primary Examiner* — Gregory Binda
(74) *Attorney, Agent, or Firm* — Andrew Wilford

(57) ABSTRACT

A coupling for transmitting torque from a drive element to a driven element has a drive-side connector rotatable about a drive-side rotation axis and a plurality of drive-side fasteners angularly spaced on the drive-side connector around the drive-side axis of the drive-side connector. A load-side connector rotatable about a load-side rotation axis carries a plurality of load-side fasteners spaced on the load-side connector around the drive-side rotation axis. A plurality of connecting elements each have a pair of opposite ends. Respective swivel joints are each connected without length compensation between one end of a respective one of the connecting elements and a respective one of the drive-side fasteners. Further respective swivel joints are each connected without length compensation between a respective one of the other ends of the connecting elements and a respective one of the load-side fasteners.

30 Claims, 12 Drawing Sheets

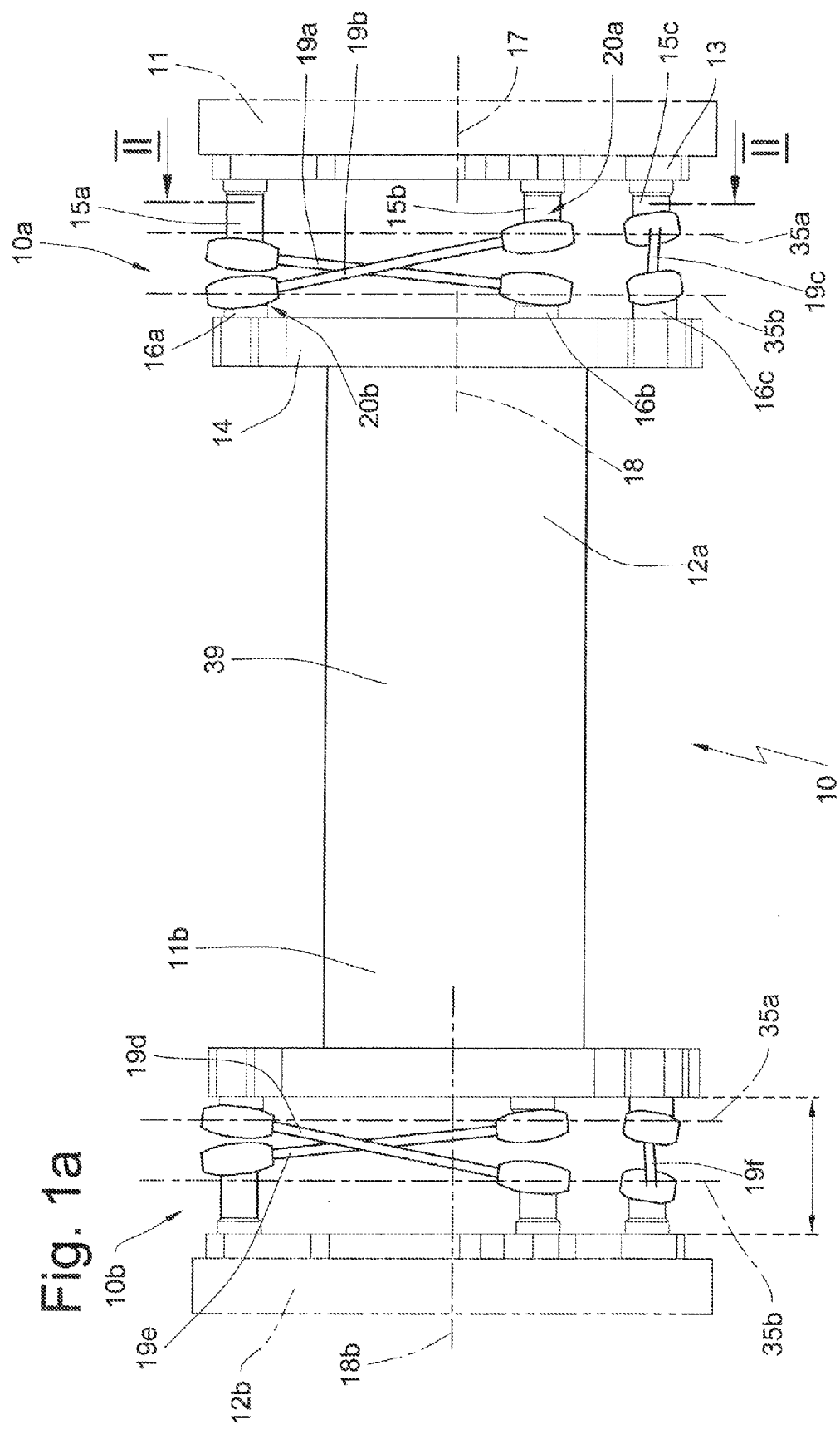

COUPLING

The invention initially relates to a coupling for transmitting torque from a drive element to a driven element and comprising a drive-side connector with a plurality of drive-side fasteners angularly spaced around a drive-side axis of the drive-side connector, a load-side connector with a plurality of load-side fasteners, and connecting elements each connected at one end to a respective one of the drive-side fasteners and via a swivel joint at the other end to a respective one of the load-side fasteners.

BACKGROUND OF THE INVENTION

Couplings of this type have been developed and produced by the applicant for some time.

Worth mentioning for example is such a coupling as disclosed in DE 42 05 666 C2. This is a link coupling in which levers that are fastened in an articulated manner between a drive element and a load or driven element can compensate for an angular and axial offset of the inter-connected units up to a certain degree. The links are mounted in rubber bushes, which perform a damping function to a certain degree. The arrangement of rubber elements in the coupling described in the last described publication is required in order to make possible an angular position of drive element and driven element relative to one another. The rubber bushes compensate for the change in spacing between the fasteners of a link during a revolution of the coupling.

A further generic coupling is described in the subsequently published EP 2 557 327 (U.S. Pat. No. 3,784,219) of applicant. There, it has already been proposed to arrange the drive-side fastener and the load-side fastener that is coupled thereto by a connecting elements with respect to the drive-side rotation axis angularly spaced from one another by 80° to 100°, in particular of 80° to 95°, and preferentially in particular by substantially 90°. This makes possible forming a so-called constant velocity joint, with which higher torque can be transmitted than with a coupling of the prior art.

OBJECT OF THE INVENTION

Starting out from the coupling of U.S. Pat. No. 8,784,219, the invention is based on the object of further developing the known coupling in such a manner that it makes possible the transmission of large torque.

SUMMARY OF THE INVENTION

The invention attains this object in that the drive-side fastener and the load-side fastener coupled thereto by a connecting element are arranged with respect to the drive-side rotation axis angularly spaced from one another by 80° to 100°, in particular by 85° to 95°, further particularly by substantially 90°, and in that the swivel joint is provided by multiple joints that are connected in series.

The coupling according to the invention serves for transmitting torque from a drive element to a driven element. The drive element can for example be formed by the flywheel of a motor and the driven element by a shaft.

To connect the coupling with the drive element, the coupling has a drive-side connector. This can for example be a flange, in particular a ring or the like. The connector on the drive element side, i.e. the connector connected to the drive element in a fixed manner, is mounted on a plurality of drive-side fasteners. These are arranged about a drive-side rotation axis. The drive-side rotation axis describes the geometric axis about which the drive-side connector is rotatable.

For connecting the coupling to the driven element, the coupling comprises a load-side connector. This, too, can be formed for example by a flange or another body. The load-side connector is connected to the driven element, i.e. for example to the driven shaft. The load-side connector likewise comprises a plurality of load-side fasteners.

The coupling according to the invention moreover comprises a plurality of connecting elements. These can be for example links or coupling rods. Each connecting element is connected on the one hand to a drive-side fastener and on the other hand to a load-side fastener, each by a respective swivel joint.

To the extent that links are mentioned within the scope of this patent application in the following, this term describes connecting elements in general.

The drive-side fastener and the load-side fastener coupled thereto by a connecting element are arranged angularly spaced from one another. The angular spacing with respect to the drive-side rotation axis amounts to approximately 80° to 100°, advantageously between 85° and 95°, and in particular approximately or substantially 90°.

Through this particular angular offset or angular spacing a design can be achieved in which the spacing of the fasteners of drive element and driven element does not change during a revolution of the coupling. Because of this, a constant velocity joint is formed, which manages without intermediate connection of length-compensating elastomer elements.

A substantial feature of the invention consists in that the swivel joint is provided by multiple joints connected in series.

The swivel joint, with which the connecting element is coupled to the drive-side fastener, and equally the swivel joint, with which the connecting element is coupled to the load-side fastener, is provided by a spherical swivel joint in U.S. Pat. No. 8,784,219, which makes possible three degrees of freedom of rotation.

The invention recognized that along the three different axes standing perpendicular on top of one another preferred working angles occur during the operation in the case of a generic coupling. The invention furthermore recognizes that for optimizing the working angles or the working paths a spherical swivel joint previously described in U.S. Pat. No. 8,784,219 can be replaced through multiple joints that are connected in series, one after the other. Because of this a design optimization of the connecting element and of the swivel joints can take place on the one hand. On the other hand, an optimization of the individual joints the requirements for this application purpose can take place in adapting to desired application cases or application purposes.

It is desired in particular to provide a coupling that ensures a long service life with high rotational speeds.

The swivel joint that according to the invention consists of multiple joints connected in series can be formed of different bearings that are connected in series. This can be a combination of multiple different bearings, wherein this combination can comprise for example at least one pivot bearing, in particular a rolling bearing, that for example also a self-aligning roller bearing or a self-aligning ball bearing or for example also a torsion joint.

Of substantial significance is that the swivel joint of multiple joints connected in series makes possible a displaceability of an end of the link relative to the fastener that is adjacent to the other end of the link, along three degrees of freedom of rotation.

Here, it can be provided with a particularly advantageous configuration of the invention that at least one joint is provided by a pivot bearing. Pivot bearing in terms of the present patent application describes a bearing that in the literature is also described as a radial bearing, which permits a rotatoric movement substantially only about a rotation axis, the so-called pivot bearing axis.

In terms of this configuration of the invention, the spherical joint that is previously described in U.S. Pat. No. 8,784,219 can for example be replaced by three pivot bearings that are connected in series, the respective pivot bearing axes stand perpendicular to one another.

In an advantageous configuration of the invention, the joint of the multiple joints that are connected in series that is next to the load-side fastener and/or the drive-side fastener is formed as a pivot bearing. The pivot bearing axis in this case is formed in particular substantially perpendicularly to the drive-side rotation axis. This configuration takes into account that the largest working angles or working parts during the operation of the coupling occur about this pivot bearing axis.

According to an advantageous configuration of the invention, the pivot bearing comprises lubricating means through which the service life of the joint can be significantly increased.

Possible lubricating means are in particular dry lubricating means. Such a dry lubricating means can also be provided by a particular coating.

According to a further advantageous configuration of the invention, the pivot bearing comprises a bearing shell and a bearing shaft that is rotatable about a pivot bearing axis therein. This configuration offers the possibility of arranging the bearing shell in a fixed manner with respect to the drive-side fastener, or in a fixed manner relative to the load-side fastener.

According to a further advantageous configuration of the invention, the pivot bearing is provided by a rolling bearing. This makes possible a very long service life and on the other hand utilizing commercially available bearings.

Further advantageously, the rolling bearing is formed by a needle bearing.

According to a further advantageous configuration of the invention, at least one joint is provided by a self-aligning roller bearing or a self-aligning ball bearing. In addition to rotation about a first axis, such a joint can also additionally permit a tilting movement about a second axis, the so-called tilting axis, which is perpendicular to the rotation axis. The configuration makes it possible to provide the swivel joint of multiple joints connected in series, while making use of as low as possible a number of bearings.

According to a further advantageous configuration of the invention, the pivot bearing axis is substantially aligned perpendicularly to the drive-side rotation axis.

This configuration takes into account that about this pivot bearing axis the greatest working angles occur during the operation of the coupling.

According to a further advantageous configuration of the invention, a connecting element each comprises a first pivot bearing with a first bearing shell and a first bearing shaft that is rotatable about a first pivot bearing axis therein and a second pivot bearing with a second bearing shell and a second bearing shaft that is rotatable about a second pivot bearing axis therein, wherein the first bearing shell is arranged fixed relative to the drive-side fastener and wherein the second bearing shell is arranged fixed relative to the load-side fastener. Because of this, a simple design can be achieved with a configuration of the connecting element that with respect to a center plane of the connecting element is substantially symmetrical.

The first pivot bearing axis and the second pivot bearing axis are advantageously aligned parallel to one another. This makes possible a particularly simple design.

According to a further advantageous configuration of the invention, the bearing shaft is connected to a spherical surface portion in a fixed manner. The spherical surface portion can for example be engaged over by an eye of the connecting element. The coupling element in this respect can comprise a first joint provided by the pivot bearing described above, in particular rolling bearing and a second joint that is connected in series with the pivot bearing, which is provided by the spherical surface portion and the eye.

While the pivot bearing can allow working angles that occur during the operation of the coupling of for example 6° to 15°, in particular 6° to 12°, in particular advantageously between 8° and 11°, the second joint that is formed by the spherical surface portion and eye can allow substantially smaller working angles of for example only one or two degrees, wherein the rotary movement that is allowed by the second joint takes place about a rotation axis that is substantially perpendicular to the pivot bearing axis of the pivot bearing.

According to an advantageous configuration of the invention, a further joint can be provided by a torsion joint. The torsion joint can for example be provided by a connecting element that is altogether configured torsionally soft. To this end, the connecting element based on its longitudinal center axis can comprise a predetermined bending point in its middle region, which is formed for example by a cross-sectional tapering of the connecting element. To this end it can be provided that the first end of the connecting element is designed torsionable about a longitudinal center axis of the connecting element relative to a second end of the connecting element. This makes possible a particularly simple design of a connecting element and the possibility of keeping the number of the joints that have to be provided in a connecting element altogether low.

Instead of a connecting element of the prior art, which is connected on its opposite ends to the drive-side fastener on the one end and the load-side fastener on the other end via a spherical swivel joint, a connecting element according to the invention can comprise a pivot bearing each on both ends and a second joint, which is provided for example through a spherical surface portion and an eye, or which at any rate allows a tilting movement or pivot movement about an axis that is perpendicular to the pivot bearing axis of the first joint, and provides a third joint, for example through a torsionable connecting element, in order to make possible the same numbers of degrees of freedom as a spherical joint.

According to an advantageous configuration of the invention, the drive-side fasteners are arranged in a common radial plane of the drive-side rotation axis. Advantageously, the drive-side fasteners are arranged on a common radius about the drive-side rotation axis.

Further advantageously, the load-side connector has a drive-side rotation axis. Further advantageously, the load-side fasteners are arranged in a common radial plane of the load-side rotation axis.

Finally, it can be additionally provided advantageously that the load-side fasteners are arranged on a common radius about the load-side rotation axis.

Finally it can be advantageously provided that the radius on which the drive-side fasteners are arranged about the drive-side rotation axis and the radius, on which the load-side fasteners are arranged about the load-side rotation axis, are identical in the amounts.

The number of the connecting elements can be selected as desired. Advantageously, connecting element trios can be provided, so that in each case between a drive-side connector and a load-side connector three connecting elements are provided.

Advantageously, the links that are provided in each case between a drive-side connector and a load-side connector are arranged equidistantly from one another in angularly.

The invention furthermore relates to a coupling that is developed further in such a manner that it makes possible the transmission of large torque.

This coupling is characterized in that the drive-side fastener and the load-side fastener that is coupled thereto by a connecting element are arranged with respect to the drive-side rotation axis by 80° to 100°, in particular by 85° to 90°, further particularly by substantially 90° angularly spaced from one another, and in that the connecting element each is substantially formed dumb-bell-shaped and comprises a cross-sectional tapering or cross-sectional weakening in the middle.

Through the dumb-bell-like design and a cross-sectional weakening that is provided in the middle with respect to a longitudinal center axis of the link, a torsionable configuration of the connecting element is made possible. Because of this, omitting pivot bearing joints, also omitting spherical joints can be achieved without reducing the number of the degrees of freedom.

Through the substantially dumb-bell-like design of the connecting element one succeeds in accommodating multiple, in particular two, joints connected in series, for example a joint comprising a pivot bearing and a spherical portion in the region of the ends of the connecting element.

The invention is again based on the object of further developing the known coupling in such a manner that it makes possible the transmission or large torque.

The invention solves this object in that the drive-side fastener and the load-side fastener that is coupled thereto by a connecting element are arranged with respect to the drive-side rotation axis by 80° to 100°, in particular by 85° to 95°, further particularly by substantially 90° angularly spaced from one another, and in that the connecting element is designed torsionable in such a manner that its first end that is connected to the drive-side fastener in an articulated manner is twistable about a longitudinal center axis of the connecting element on the end that is connected to the load-side fastener in an articulated manner.

The principle of the invention substantially consists in that the connecting element is configured torsionable. The torsionable configuration can be achieved in particular through a torsionally soft design of the connecting element. This makes possible a twisting of its first end relative to its second end. Because of this, the number of the joints on a connecting element can be altogether kept low.

The invention is again based on the object of further developing the known coupling in such a manner that it makes possible the transmission of large torque.

The invention solves this object in that the drive-side fastener and the load-side fastener that is coupled thereto by a connecting element are arranged with respect to the drive-side rotation axis angularly spaced from one another by 80° to 100°, in particular by 85° to 95°, further particularly by substantially 90°, and in that the swivel joint comprises a pivot bearing that allows rotation only about a pivot bearing axis.

The principle of the invention substantially consists in forming the swivel joint in such a manner that it comprises at least one pivot bearing, which allows rotation only about a pivot bearing axis. Through this special, optimized design configuration of the bearing it can be achieved that a rolling bearing is provided. This can make possible a long service life of a coupling even when large torque at high rotation speed is transmitted.

According to a further advantageous configuration of the invention, two couplings of the type described above are connected to one another with the help of a shaft. This makes it possible to provide a coupling that also allows a radial offset between drive element and driven element or can compensate for such. Such a double-cardanic design is known per se from the prior art, however not with the provision of the particular geometry of the drive-side and load-side fasteners and of the connecting elements.

With respect to the couplings described above, it is true that the different couplings can also have individual or multiple features of the respective other couplings described. For the following description of the embodiments it is also true that features, even to the extent that these are only described with one embodiment can also be provided with other embodiments.

BRIEF DESCRIPTION OF THE FIGURES

Further advantages of the invention are described with reference to the following description of the embodiments shown in the figures. Therein:

FIG. 1a is the embodiment of FIG. 1 according to the view arrow Ia in FIG. 1 in a further schematic view.

SPECIFIC DESCRIPTION OF THE INVENTION

Figure 1:
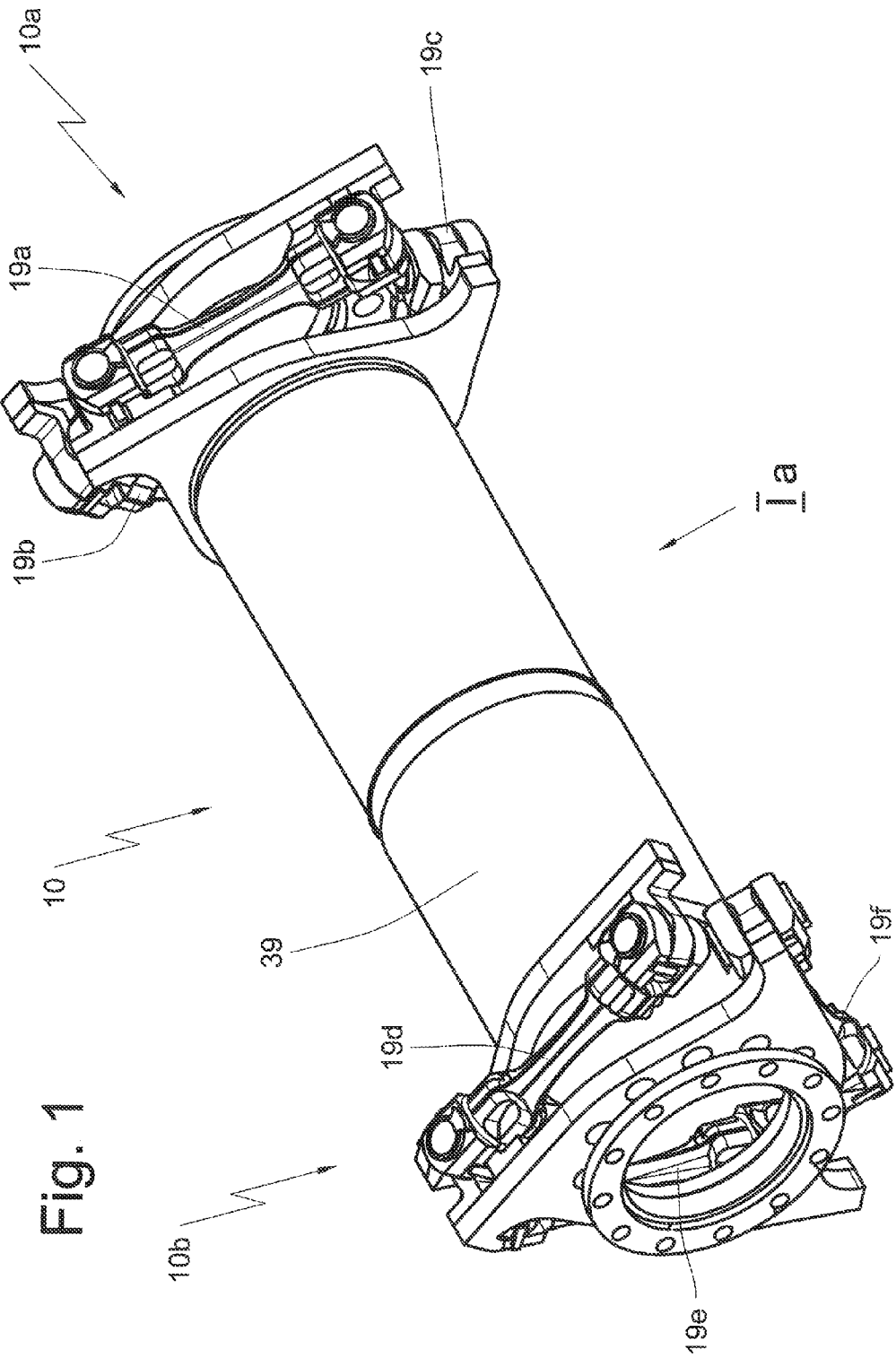
FIG. 1 is an embodiment of a coupling according to the invention in double-cardanic configuration in a perspective, schematic view.

The coupling shown at 10 in the drawings is described in the following with reference to the embodiments in the drawings. At the outset of the following description it is mentioned that for the sake of clarity the same parts or parts or elements comparable to one another, also to the extent to which these can be assigned to different embodiments, are marked with the same reference characters, partly with the addition of lower-case characters.

The coupling assembly of FIG. 1 is indicated generally at 10 and comprises a first coupling 10a and a second coupling 10b interconnected by a shaft 39. The coupling assembly 10 is shown further schematically in a partly sectional schematic view compared with the view of FIG. 1 in FIG. 1a.

The coupling 10a of FIG. 1a serves for connecting a merely schematically shown drive element 11 to a driven element 12a. The driven element 12a in the embodiment of FIG. 1a is formed by the shaft 39, and at the same time constitutes the drive element 11b for the coupling 10b. The coupling 10b serves to connect the drive element 11b to the merely schematically shown driven element 12b.

The shaft 39 here thus constitutes the driven element 12a of the first coupling 10a and simultaneously the drive element 11b of the second coupling 10b.

While the embodiment of FIGS. 1 and 1a shows a double-cardanic arrangement of two couplings 10a, 10b only one coupling is provided in each of the other embodiments of the invention. Such an embodiment is described initially with reference to FIGS. 2 and 3, namely by means of to the right coupling 10a of FIG. 1a.

Figure 2:
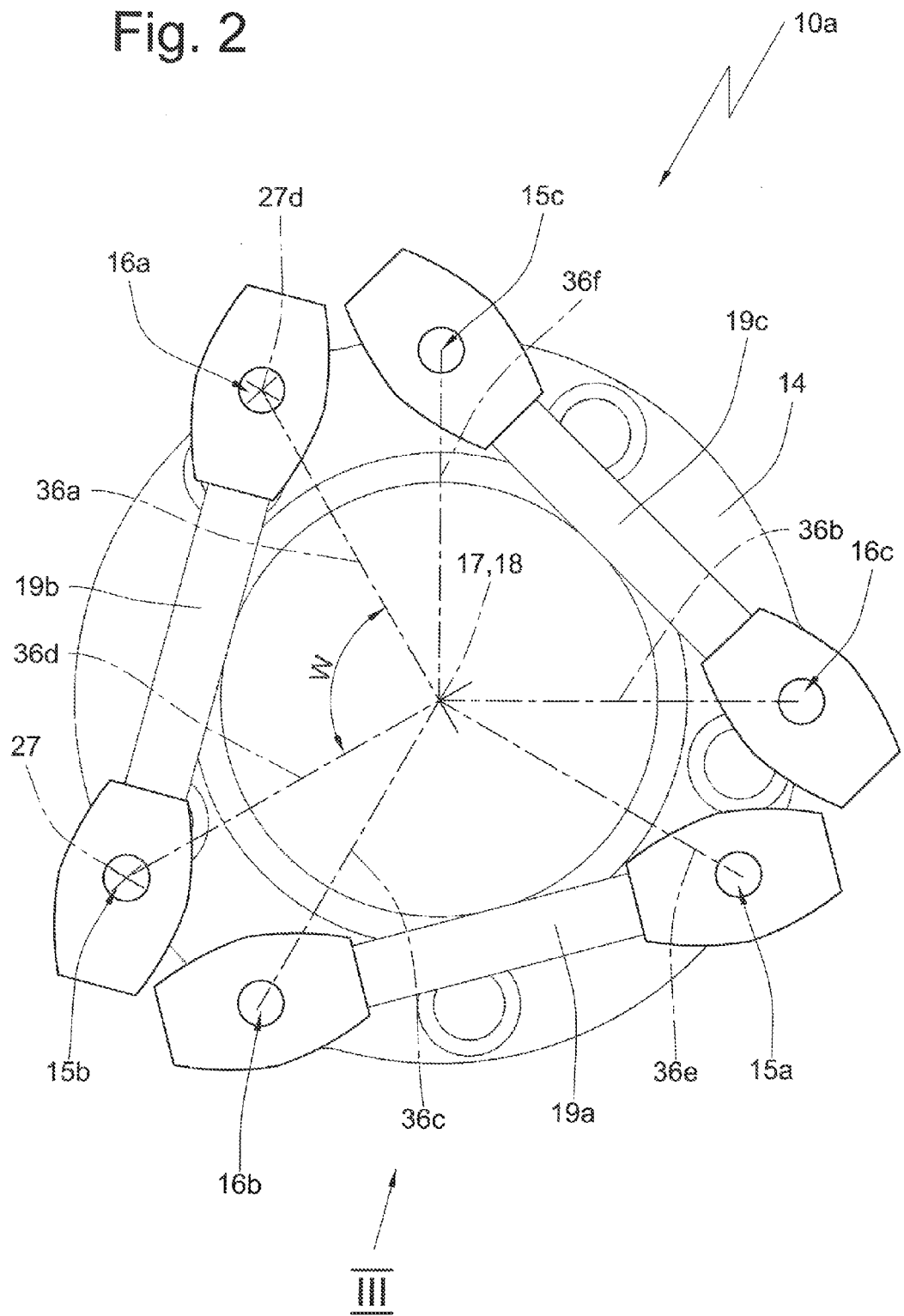
FIG. 2 shows highly schematically the coupling of FIG. 1a according to view arrow II-II in FIG. 1a, the shaft and the in FIG. 1a left coupling having been omitted.

The coupling 10a comprises a drive-side connector 13, fixed to the drive element 11. This can be for example a annular flange 14 that is evident for example in FIG. 2. FIG. 2 however shows—corresponding to the view of the view arrow II-II in FIG. 1a—the load-side flange 14. The drive-side annular flange 13 of this coupling 10a however is designed identically to the load-side flange 14 forming the load-side connector.

The flange 13 carries drive-side fasteners 15a, 15b, 15c. The drive-side fasteners 15 are fixed to the drive-side connector 13. The drive-side fastener 15 can for example be provided by mounts, on which the bearing shells 25 of swivel joints to be described later on are fixed.

The drive-side connector 13 is fixed to the drive element 11. The drive element 11 can for example be the flywheel of a motor.

The coupling 10a additionally comprises a load-side connector 14. This in turn is fixed to the driven element 12a. The load-side connector 14 comprises load-side fasteners 16a, 16b, 16c, each of which is fixed to the load-side connector 14.

FIG. 1a makes it clear that each drive-side fastening point (for example the drive-side fastening point 15a) is connected to a respective load-side fastening point (according to FIG. 1a to the fastening point 16b) through a respective connecting element 19a.

In the illustrated embodiment, each coupling 10a comprises three connecting elements 19a, 19b, 19c each that can also be termed links.

The FIG. 1a left coupling 10b also comprises three links 19d, 19e, 19f.

Figure 3:
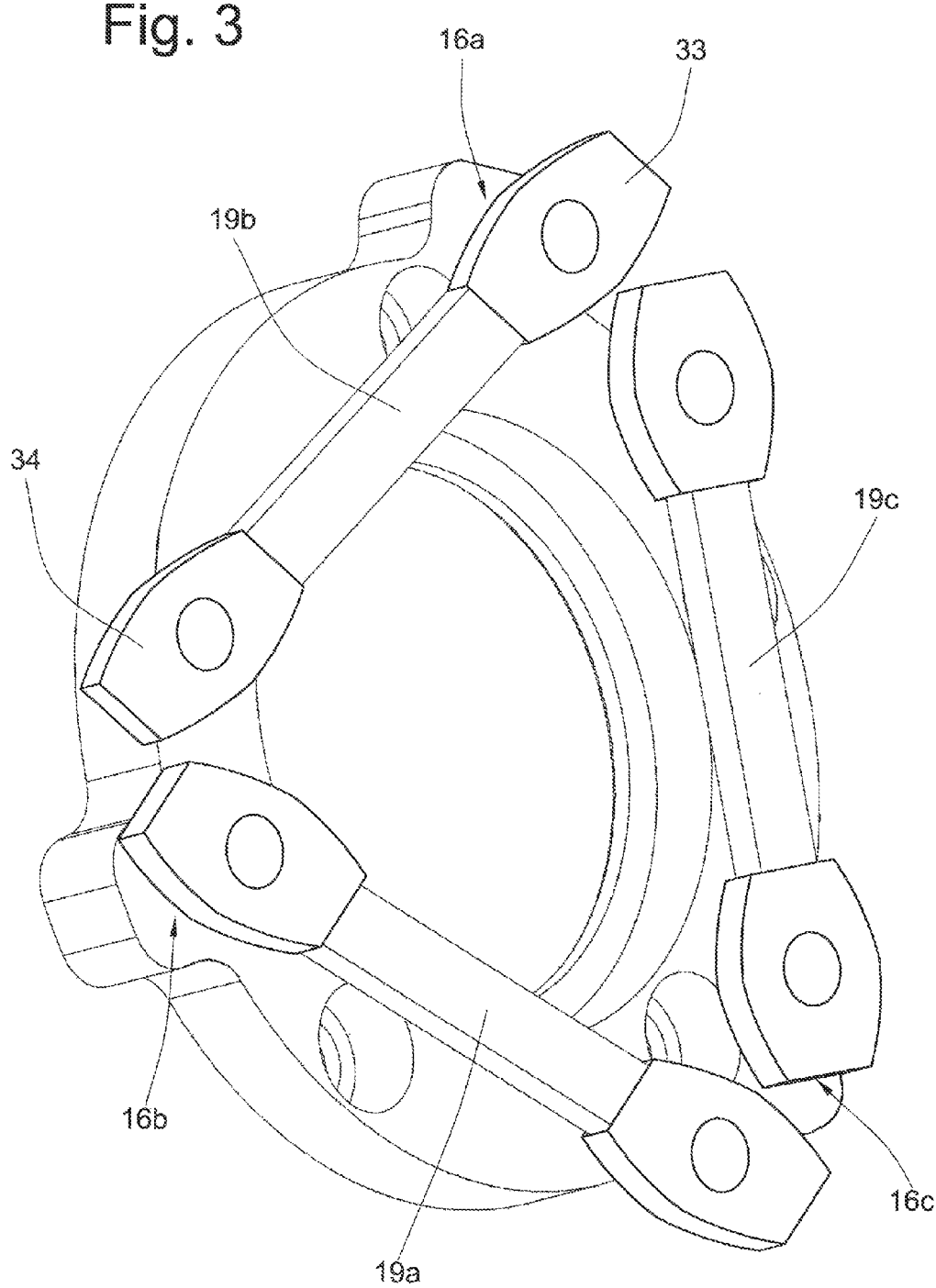
FIG. 3 shows the embodiment of the coupling of FIG. 2 in a simplified, schematic view approximately according to the arrow III in FIG. 2 in an individual view.

FIGS. 1a, 2 and 3 show the links 19a, 19b, 19c each only highly schematically. The FIGS. 4 to 9 each show a link 19 in a view that by contrast is detailed.

The drive-side connector 13 a drive-side rotation axis 17 and the load-side connector 14 a load-side rotation axis 18.

In the embodiments of FIGS. 1a and 2, the drive-side rotation axis 17 and the load-side rotation axis 18 are coaxial. The coupling 10a however serves to compensate for axial, radial, or angular offset. The drive-side rotation axis 17 and the load-side rotation axis 18 can therefore also be positioned at an angle or parallel to one another.

In a double-cardanic arrangement of two couplings 10a and 10b according to 1 and 1a, the drive-side rotation axis 17 of the first coupling 10a and the load-side rotation axis 18b of the second coupling 10b can be axially offset, angularly, or radially offset.

FIG. 2 makes it clear that the load-side fasteners 16a, 16b, 16c are arranged at the same radial spacing 36a, 36b, 36c from the load-side rotation axis 18.

The drive-side fasteners 15a, 15b, 15c that are not shown in FIG. 2 are also at the same radial spacing 36d, 36e, 36f from the drive-side rotation axis 17.

FIG. 2 merely shows the load-side fasteners 16a, 16b, 16c of the coupling 10a and merely indicates the positions of the drive-side fasteners 15a, 15b, 15c.

All the drive-side fasteners 15a, 15b, 15c and all the load-side fasteners 16a, 16b, 16c are in a common radial plane 35a, 35b.

FIG. 2 makes it clear that each load-side fastener (e.g. 16a) is spaced from the respective drive-side fastener at an angle w relative to the drive-side fastener (15b) of the respective connecting element (19b) that in the embodiment amounts to exactly 90°.

The remaining drive-side fasteners located opposite one another and the load-side fasteners of the other connecting element 19a, 19c are each—insofar as each belong to a connecting element—angularly spaced from one another by 90° each.

Through this particular angular spacing one succeeds in forming a constant velocity joint with the described advantageous characteristics.

FIGS. 4 to 9 show a concrete, particularly advantageous configuration of a connecting element 19, the so-called link that is now discussed in more detail.

Figure 4:
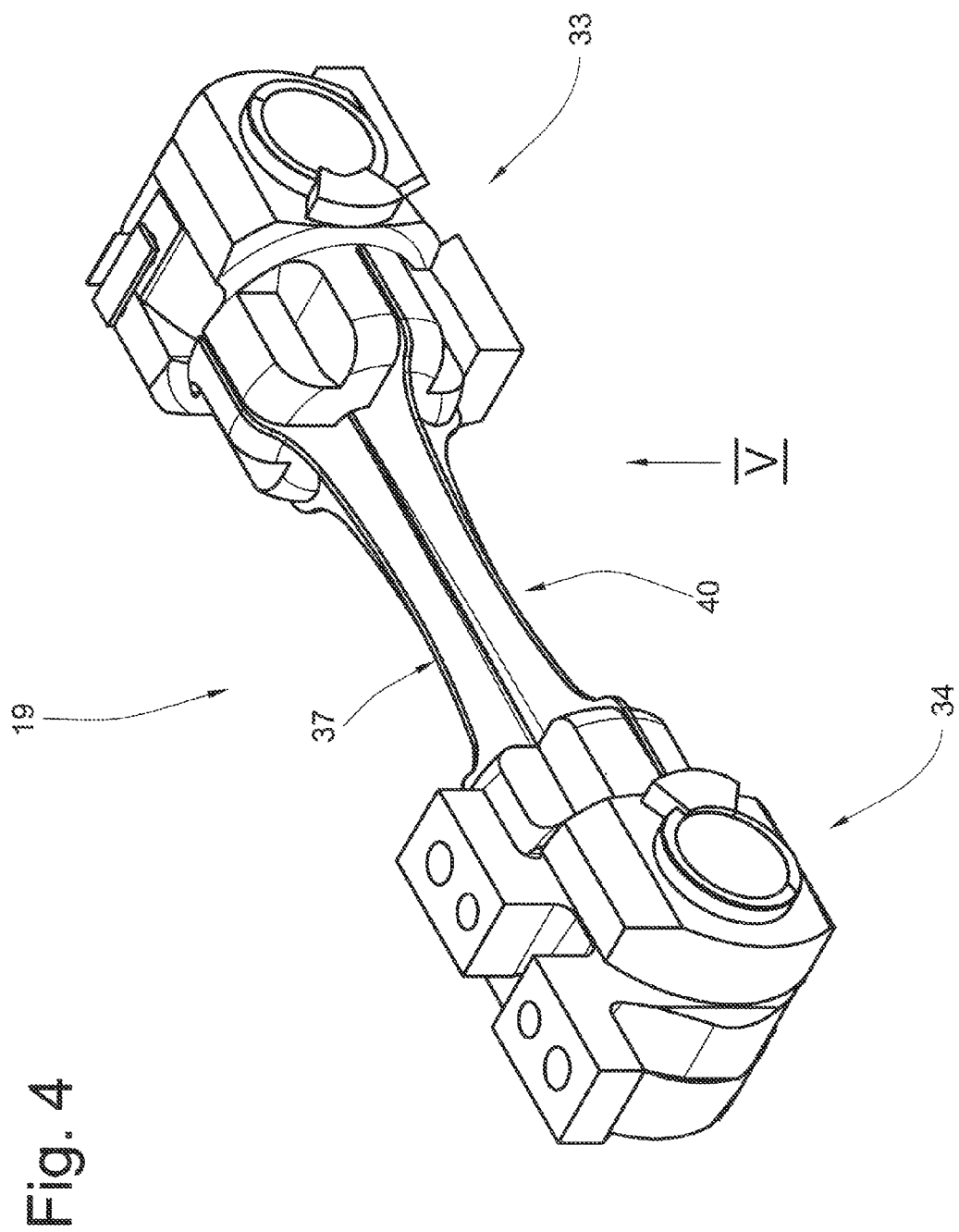
FIG. 4 shows a connecting element of a coupling according to the invention, represented highly schematically, in a schematic individual view.
Figure 5:
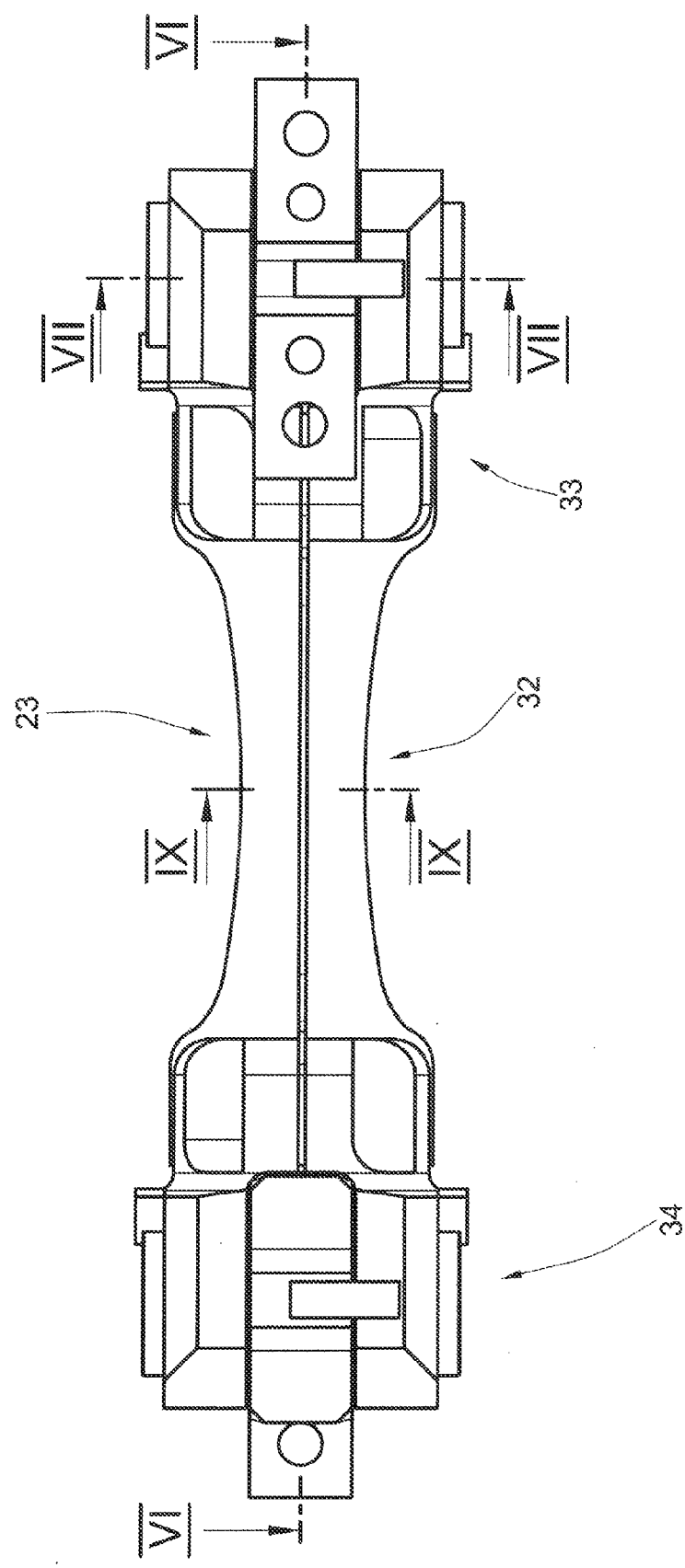
FIG. 5 shows the connecting element of FIG. 4 approximately according to the arrow V in FIG. 4 in a bottom view.

Even the perspective view of FIG. 4 shows that the link 19 is substantially shaped like a dumb-bell or bone, with a first substantially spherically formed end 33 and a second substantially spherically formed end 34. In addition, the link 19 comprises a middle portion 40 that with respect to the two spherical ends 33, 34 is narrow so that a dumb-bell or bone shape is obtained. The middle portion 40 in addition has a cross-sectional tapering 37 or cross-sectional weakening that will still be discussed in more detail below.

FIG. 1a shows how in the coupling 10a the connecting element 19b is connected to the drive-side fastener 15b via a first swivel joint 20a and to the load-side fastener 16a via a second swivel joint 20b.

The swivel joints 20a, 20b each consist of three joints 21, 22 and 23 connected in series as will be explained now in the following with reference to FIGS. 4 to 9.

Figure 6:
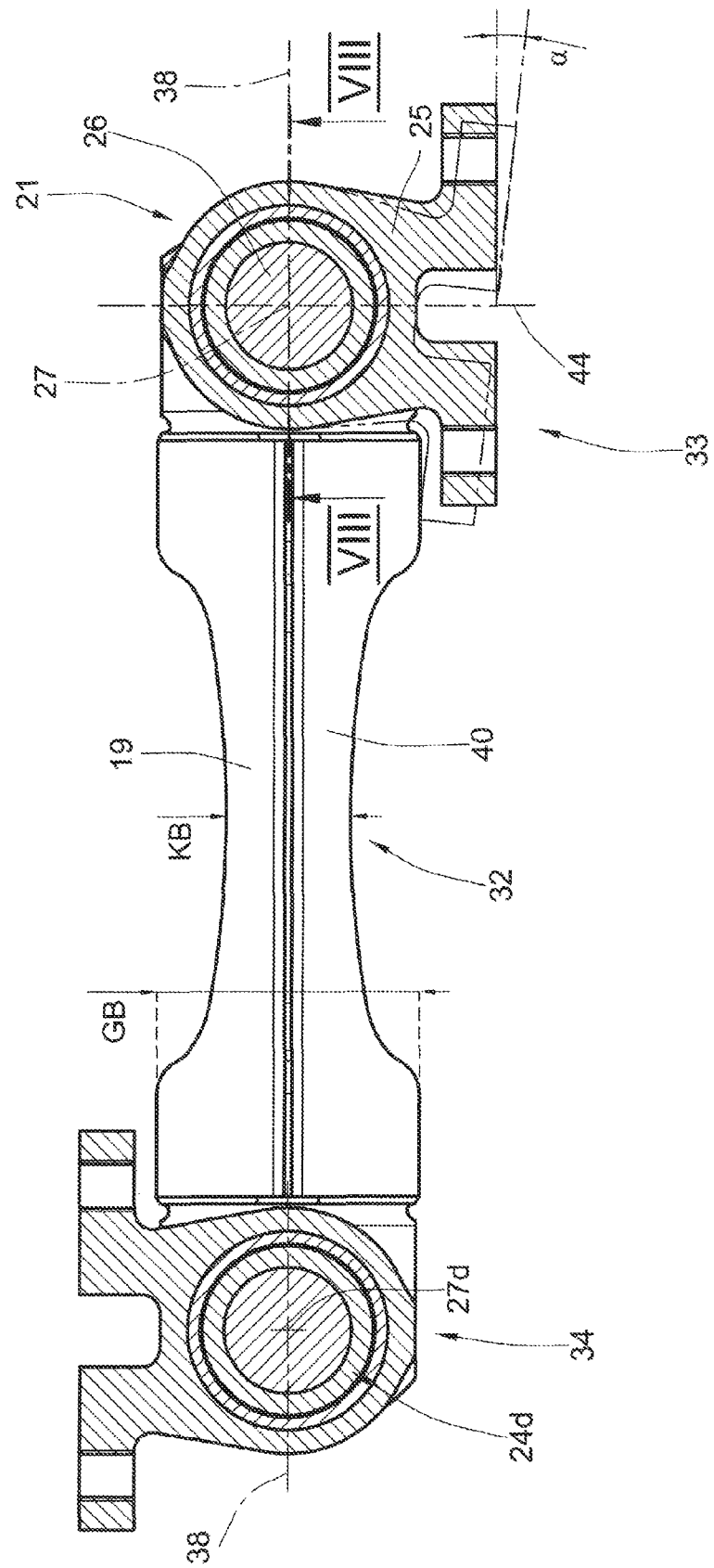
FIG. 6 shows a partly sectional, schematic view through the connecting element of FIG. 5, approximately along the section line VI-VI of FIG. 5.
Figure 7:
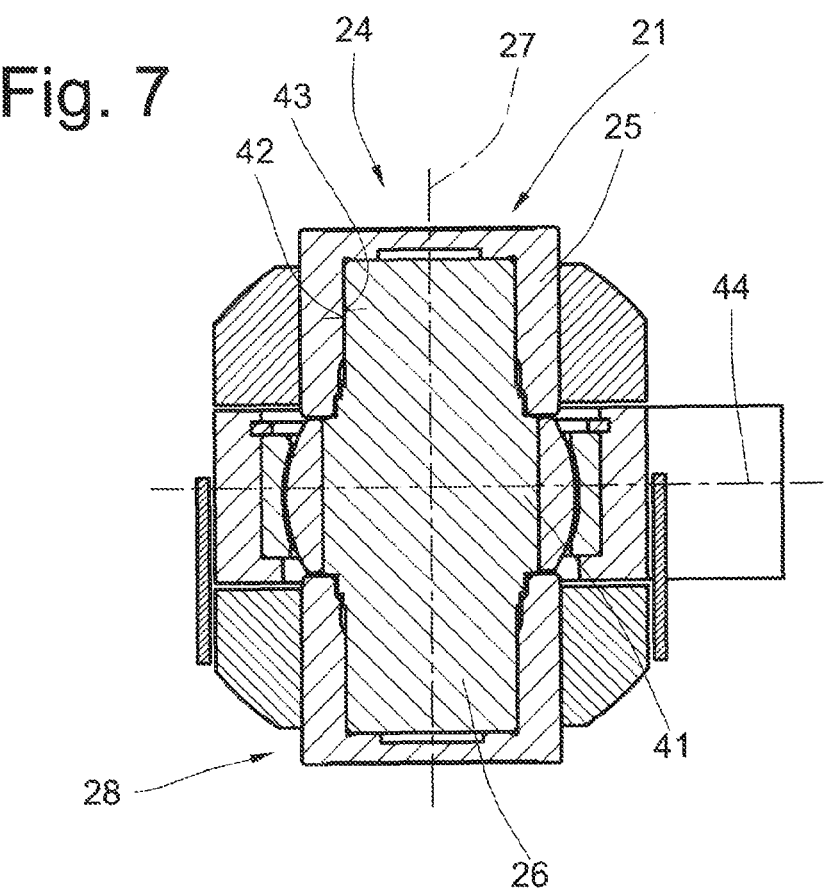
FIG. 7 is a partly sectional, schematic view through the connecting element of FIG. 5, approximately along the section line VII-VII of FIG. 5.

The first joint 21 in the embodiment is formed by a pivot bearing 24, and is initially illustrated in FIGS. 6 and 7: the pivot bearing 24 comprises a bearing shell 25 that is fixed relative to the drive-side fastener. Based on the link 19b of FIG. 1a, the bearing shell 25 of the swivel joint 20a of this link 19b is thus arranged fixed relative to the drive-side-fastener 15b that is not shown in the FIGS. 6 and 7.

Within the bearing shell 25, a bearing shaft 26 is rotatable about a pivot bearing axis 27. The bearing shaft 26 is a substantially cylindrical body that has a bulge 41.

At the bulge 41, the bearing shaft 26 is widened and projects out of the bearing shell 25 transversely to the pivot bearing axis 27.

The pivot bearing 24 allows rotation of the bearing shaft 26 only about the pivot bearing axis 27, but not about any other axis.

Figure 13:
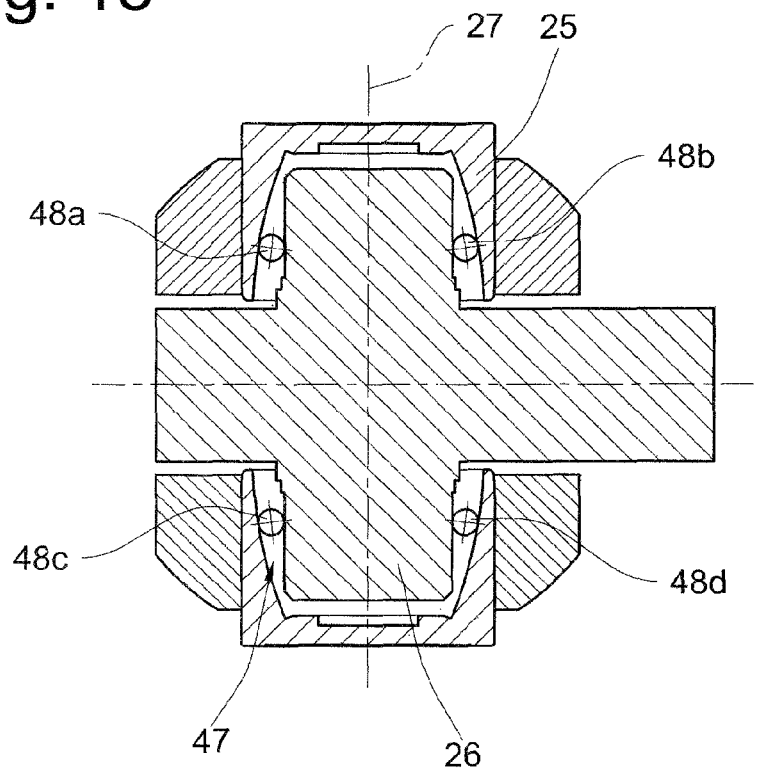
FIG. 13 is another view like FIG. 7, but showing a self-aligning roller bearing.

The pivot bearing 24 is a rolling bearing (See also FIG. 13). This means that there are between the outside 42 of the bearing shaft 26 and the inside 43 of the bearing shell 25 multiple rolling elements, in particular balls, or in a preferred embodiment, cylindrical rollers. Making use of cylindrical rollers, also called needles, the rolling bearing 28 thus formed is embodied as a so-called needle bearing in the advantageous embodiment.

Figure 12:
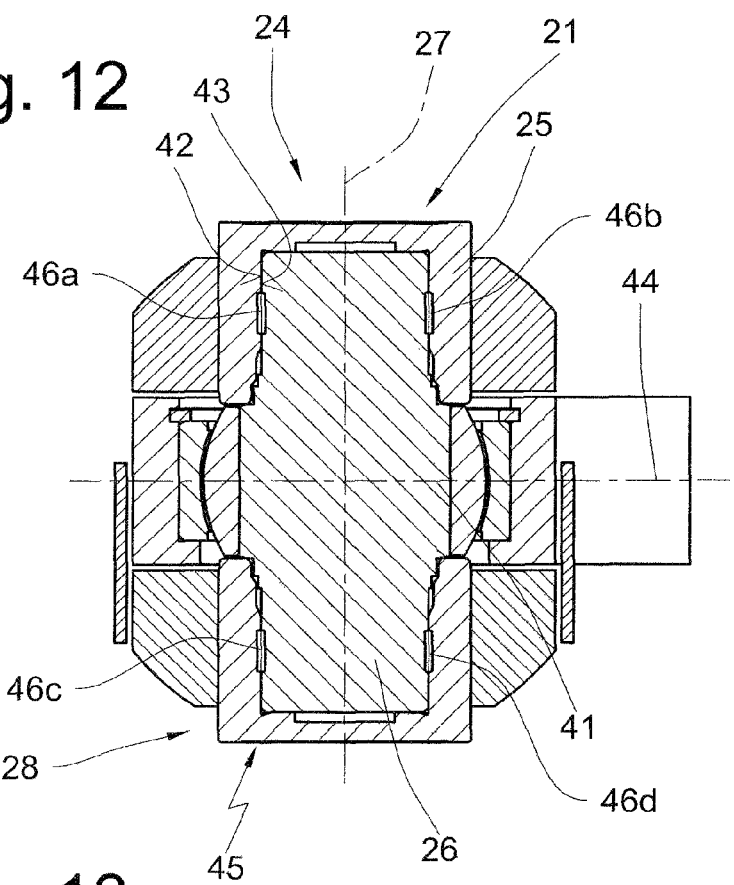
FIG. 12 is a view like FIG. 7, but showing a needle bearing.

Rotation of the bearing shaft 26 about the axis of rotation 27 is effected in this regard subject to the rotation of multiple cylindrical rollers as shown in FIG. 12 where a needle bearing 45 having needle rollers 46a-d is shown. Similarly, FIG. 13 shows a roller bearing 47 having rollers 48a-48d.

The second joint 22 is formed by a spherical surface portion 30 on the bulge 41. The spherical surface portion 30 is engaged in an eye 31 that is fixed relative to the middle portion 40 of the link.

Figure 8:
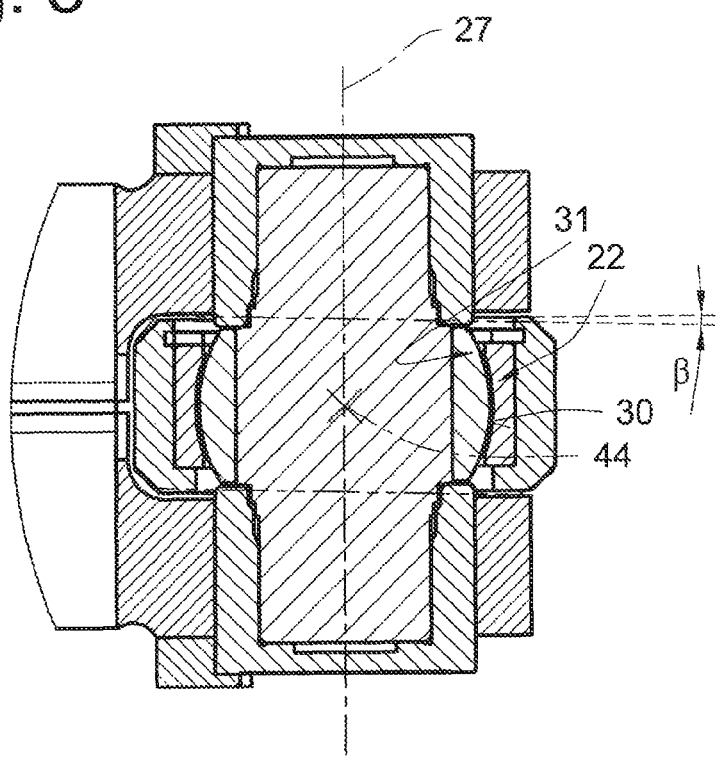
FIG. 8 is a partly sectional, schematic view through the connecting element approximately along the section line VIII-VIII in FIG. 6.
Figure 9:
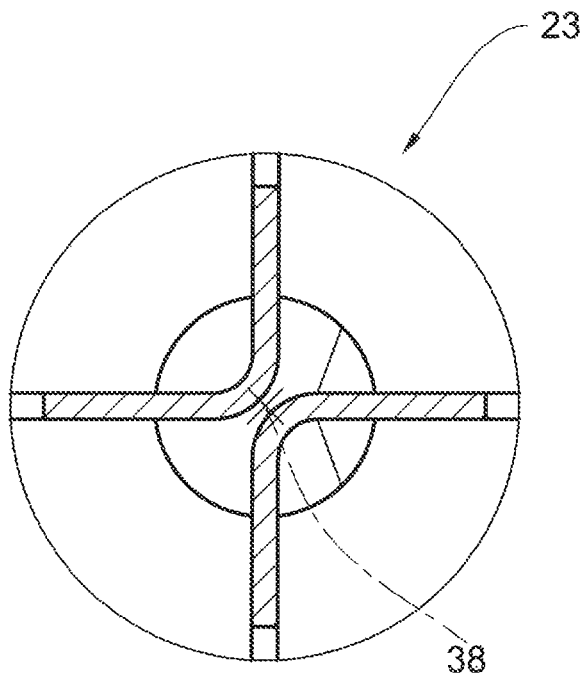
FIG. 9 is a partly sectional, schematic view through the connecting element, approximately along the section line IX-IX in FIG. 5.

The spherical surface portion 30 allows a spherical or swiveling movement within certain, small angular ranges. Above all, the second joint 22 formed by the spherical surface portion 30 and the eye 31 allows rotation of the middle portion 40 of the connecting element 19 relative to the bearing shaft 26 about a rotation axis 44 (FIGS. 6 and 8). The axis of rotation 44 is perpendicular to the pivot bearing axis 27.

Finally, the swivel joint 20 additionally comprises a third joint 23 that is formed by a bending joint or torsion joint 32.

Providing a torsion joint is aided by a cross-sectional tapering 37 of the link.

FIG. 6 shows that in the region of the ends 33, 34 the link 19 has a width GB that is substantially greater than the width KB in the middle of the link 19 relative to its longitudinal center axis 38.

By weakening of the cross-section of the link 19 exactly in the region of its middle (at 37), the link element 19 is altogether configured torsionally soft and elastically deformably about its longitudinal center axis 38. In the embodiment of a connecting element shown in FIG. 9, its torsionally soft configuration is specifically provided through the use of two substantially L-section profiles that are open toward the outside.

While in the case of further embodiments that are not shown the described cross-sectional weakening in the middle region of the connecting element need not be mandatorily present, the torsionable configuration in the embodiment is at least favored through the arrangement of the middle cross-sectional tapering. The one end 34 of the link 19 in this respect can be twisted about the longitudinal center axis 38 relative to the second end 34 of the link within a predetermined angular range during operation of the coupling 10.

The swivel joint 20 in the embodiment is formed by a first joint 21 formed as a radial bearing 24, a second joint 22 formed as a spherical joint and by a third joint 23 formed as a torsion joint, these three joints being connected in series.

The three rotary axes 27, 44, 38 that are provided by the three different joints 21, 22, 23, are all perpendicular to one another. The three rotary axes or joint axes 27, 44, 38 all intersect one another in one point, the so-called point of articulation.

It is clear to the person skilled in the art that other designs and series connections of such joints are included in the invention.

Because of the design of the second joint 22, as is shown in particular in the FIGS. 7 and 8, a tilting of the connecting element about the tilting axis or axis of rotation 44 is primarily achieved. Rotation about the axis of rotation 27 of the first joint 21 is possible in principle in the case of such joints 22, which make use of spherical surface portions 30, but will not take place during the operation as a rule since friction between the portions 30 and 31 is substantially higher than the friction that is accompanied by rotation about the rolling bearing 21 about the axis of rotation 27.

The invention recognizes that with generic couplings 10 a typical working angle during the operation of the coupling about the pivot bearing axis 27 can be relatively large. Thus, the working angle α shown for example in FIG. 6 between the bearing shell 25 in broken and solid lines is approximately 5° to 9°, in particular approximately 6° and illustrates that larger working angles are to be expected here.

For this reason, which is evident in particular also in FIG. 6, the two pivot bearing axes 27, 27d on the two swivel joints 20a, 20b on a link 19 are orientated parallel to one another.

In addition, it is preferred to form these pivot bearings 24, 24d as rolling bearings.

Compared with this, only a very small angle β, the so-called tilting angle, of for example 0.05° to 2°, in particular an angle between 1° and 2°, or—depending on the embodiment, an angle of approximately between 0.1° and 0.4° is to be expected as a working angle about the axis of rotation 44 during operation of the coupling.

Finally, based on the longitudinal center axis 38 of the link 19, only a minor portion with a working angle of approximately 1° to 2° is to be expected. Depending on embodiment, the largest working angles, of for example between 6° and 15°, will be employed here.

The exact angles are obviously dependent on the selected dimensions, e.g. on the length of the links, on the installation length of the coupling, on the radial angular offsets and axial offsets to be compensated for and on the magnitude of the torque to be transmitted as well as ultimately the rotation speed.

Finally, there is the additional possibility in particular of replacing the joint 22 formed by the spherical surface portion 30 and eye 31 by a further pivot bearing that permits rotation only about a single axis of rotation 44.

Finally, the torsion joint 32 can also be replaced with such a pivot joint.

The configuration of the invention shown in the drawings is suitable in particular for high-speed couplings, i.e. for couplings 10 that operate with high rotation speeds and transmit high torque.

The spherical swivel joint known from U.S. Pat. No. 8,784, 219, which makes possible three degrees of freedom, is functionally split according to the invention over three joints that each allow one degree of freedom of rotation.

The series-connection of joints in the described manner according to the invention equally makes it possible that an end of the link relative to the drive-side or load-side fastening point fixed on the other end of this link can assume any point in space within predetermined limits, subject to utilizing the three degrees of freedom of rotation.

Finally it is pointed out here that instead of the described pivot joints and torsion joints, axial bearings, i.e. sliding joints, can also be employed. Under certain conditions, elastomeric elements can also be employed as bearing components.

In contrast with the above-described spherical joint and for providing the multiple degrees of freedom of rotation, at least one series connection of two different bearings is provided according to the invention.

Insofar as the terms self-aligning ball bearing or self-aligning roller bearing are used here, reference can be made to their definition that is usual in the prior art. It relates to bearings that in addition to a rotation about the center axis also make possible a pivoting or tilting out of a center position about a few degrees about an axis that is perpendicular to the center axis.

Figure 10:
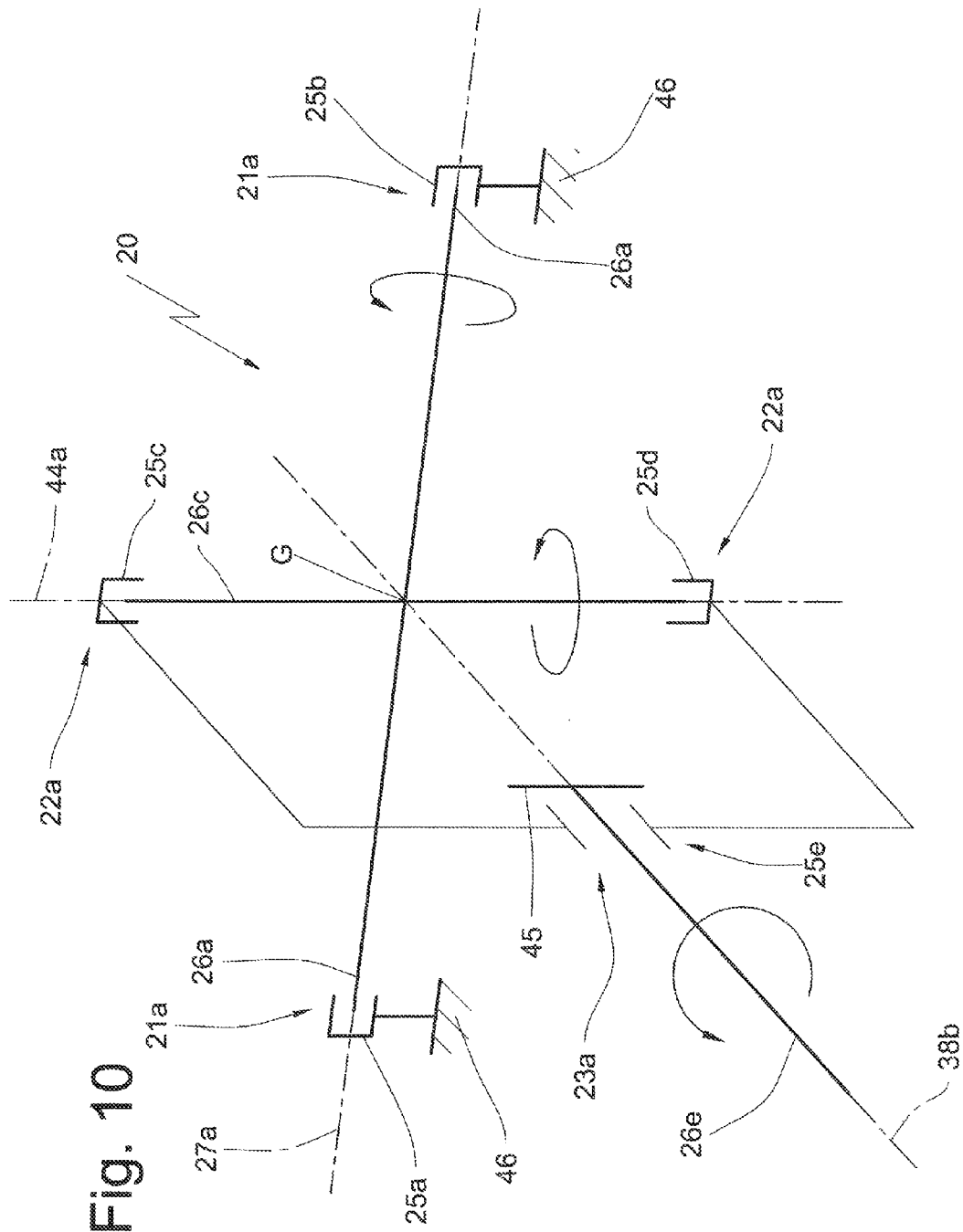
FIG. 10 is a schematic diagram showing the series connection of joints according to the invention for the different bearings in a three-dimensional view making use of schematic connection symbols.

Based on the highly schematic view of FIG. 10, it is now explained how the first joint 21a of a swivel joint 20, and the second joint 22a of the swivel joint 20 and the third joint 23a of the swivel joint 20 can be formed by bearings that are configured in any design.

Thus, FIG. 10, in a highly a schematic diagrammatic view, shows that the swivel joint 20 can comprise a first joint 21a formed of a bearing shell 25a, 25b that can be fixed at one end (i.e. on the fastener side). The thus formed bearing shell 25a, 25b holds a bearing shaft 26a that is rotatable about a geometric axis of rotation 27a.

The bearing shaft 26a is connected to a further bearing shaft 26c for joint movement therewith. The latter in turn is rotatably mounted in a further bearing shell, formed by bearing shells 25c, 25d, about the geometric axis of rotation 44a relative to the bearing shells 25c, 25d.

The bearing shells 25c, 25d in turn are connected to a bearing shell 25e in a rotationally fixed manner. The bearing shell 25e provides a pivot bearing for a further bearing shaft 26e. The latter is rotatable about a geometric axis 38b relative to the bearing shell 25e.

The geometric axes of rotation 27a, 44a and 38b extend perpendicular to one another and all intersect one another at the point G of articulation.

How the individual bearings are concretely designed is dependent on the individual embodiment. Decisive is that this series connection of joints or bearings 21a, 22a, 23a makes possible three degrees of freedom of rotation of the bearing shaft 26e relative to the fastening point 46. The fastening point 46 in this case corresponds to the drive-side or load-side fastener 15, 16. The bearing shaft 26e in this consideration corresponds to the other end of the corresponding connecting element or link that is distal to the above-described fastening point 15, 16 on the drive element side or the driven element side.

Figure 11:
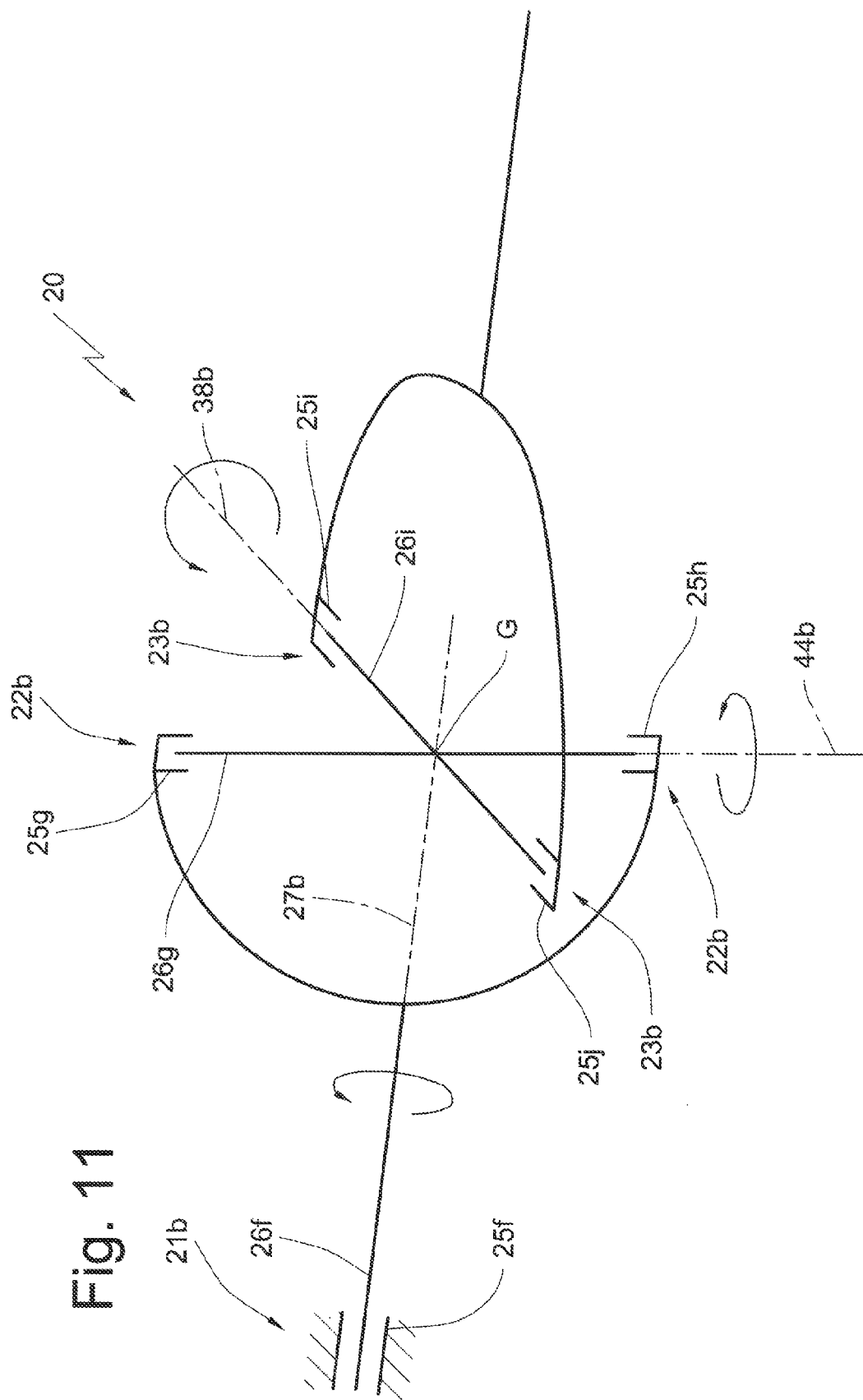
FIG. 11 shows in a view comparable to the view of FIG. 10 a diagram sketch of a further schematic embodiment.

FIG. 11 shows an embodiment of a swivel joint 20 in a further schematic diagram, in which a first joint 21b is provided by a bearing shell 25f in which a bearing shaft 26f is rotatably arranged about a geometric axis 27b. The bearing shaft 26f is fixed to bearing shells 25g and 25h of a second joint 22b. In the bearing provided by the bearing shells 25g, 25h or relative thereto, a bearing shaft 26g is rotatable about the geometric axis 44b.

The bearing shaft 26g in turn is connected to a bearing shaft 26i in a fixed manner. The bearing shaft 26i is rotatable about a geometric axis 38b relative to a bearing that is formed by bearing shells 25i and 25j. Again, the three geometric axes of rotation 27b, 44b and 38b intersect at a point of articulation G.

In this embodiment, too, a swivel joint 20 is provided that makes possible the three degrees of freedom of rotation. Again, the concrete design configuration of the individual bearings for providing a swivel joint 20 according to the invention is not relevant.

The invention claimed is:

1. A coupling for transmitting torque from a drive element to a driven element, the coupling comprising
   a drive-side connector rotatable about a drive-side rotation axis,
   a plurality of drive-side fasteners angularly spaced on the drive-side connector around the drive-side axis of the drive-side connector,
   a load-side connector rotatable about a load-side rotation axis,
   a plurality of load-side fasteners spaced on the load-side connector around the drive-side rotation axis,
   a plurality of connecting elements each having a pair of opposite ends,
   respective swivel joints each connected without length compensation between one end of a respective one of the connecting elements and a respective one of the drive-side fasteners,
   respective swivel joints each connected without length compensation between a respective one of the other ends of the connecting elements and a respective one of the load-side fasteners, each drive-side fastener and the respective load-side fastener coupled to it by the respective connecting element being angularly offset relative to the drive-side axis by 80° to 100°, each swivel joint being formed by a plurality of series-connected joints.

2. The coupling according to claim 1, wherein at least one of each of the plurality of series connected joints is by a pivot bearing.

3. The coupling according to claim 2, wherein the each pivot bearing comprises a bearing shell and a bearing shaft that is rotatable about a pivot bearing axis therein.

4. The coupling according to claim 3, wherein the bearing shell is fixed relative to the drive-side or load-side fastener of the respective end of the respective connecting element.

5. The coupling according to claim 3, wherein the bearing shaft is formed with a spherical surface portion.

6. The coupling according to claim 5, wherein the spherical surface portion is engaged over by an eye of the connecting element.

7. The coupling according to claim 2, wherein the pivot bearing is a rolling bearing.

8. The coupling according to claim 7 wherein the rolling bearing is a needle bearing.

9. The coupling according to claim 2, wherein a pivot bearing axis of the pivot bearing is substantially perpendicular to the drive-side rotation axis.

10. The coupling according to claim 1, wherein at least one joint of the plurality of series-connected joints comprises a self-aligning roller bearing or a self-aligning ball bearing.

11. The coupling according to claim 1, wherein each connecting element comprises:
    a first pivot bearing with a first bearing shell and a first bearing shaft that is rotatable about a first pivot bearing axis therein on the respective one end and
    a second pivot bearing with a second bearing shell and a second bearing shaft that is rotatable about a second pivot bearing axis therein on the respective other end, the first bearing shell being fixed relative to the drive-side fastener and the second bearing shell being fixed relative to the load-side fastener.

12. The coupling according to claim 11, wherein the first pivot bearing axis and the second pivot bearing axis are aligned parallel to one another.

13. The coupling according to claim 1, wherein at least one joint of the plurality of series-connected joints is a torsion joint.

14. The coupling according to claim 1, wherein a first end of each of the connecting elements is twistable about a longitudinal center axis of the connecting element relative to a second end of the connecting element with elastic deformation of the respective connecting element.

15. The coupling according to claim 1, wherein the drive-side fasteners are in a common radial plane of the drive-side rotation axis.

16. The coupling according to claim 1, wherein the drive-side fasteners are at a common radial spacing from the drive-side rotation axis.

17. The coupling according to claim 1, wherein the load-side connector has a load-side rotation axis.

18. The coupling according to claim 17, wherein the load-side fasteners are in a common radial plane of the load-side rotation axis.

19. The coupling according to claim 17, wherein the load-side fasteners are at the same radial spacing from the load-side rotation axis.

20. The coupling according to claim 19, wherein a radial spacing of the drive-side fasteners from the drive-side axis of rotation, and the a radial spacing of the load-side fastener from the load-side axis of rotation are identical.

21. The coupling according to claim 1 wherein the drive-side connector is a flange.

22. The coupling according to claim 1 wherein the load-side connector is a flange.

23. The coupling according to claim 1 wherein each drive-side fastener and the respective low-side fastener coupled to it by the respective connecting element are angularly offset relative to the drive-side axis by 85° to 95°.

24. The coupling according to claim 1 wherein each drive-side fastener and the respective low-side fastener coupled to it by the respective connecting element are angularly offset relative to the drive-side axis by substantially 90°.

25. A coupling for transmitting torque from a drive element to a driven element, the coupling comprising:
   a drive-side connector rotatable about a drive-side rotation axis,
   a plurality of drive-side fasteners spaced angularly about the drive-side rotation axis on the drive-side connector,
   a load-side connector rotatable about a load-side axis,
   a plurality of load-side fastener spaced angularly about the load-side rotation axis on the load-side connector,
   respective connecting elements each having a pair of opposite ends, and
   respective swivel joints each connecting a respective one of the one ends of the connecting elements without length compensation of the respective connecting element to a respective one of the drive-side fasteners, and
   respective swivel joints each connecting a respective one of the other ends of the connecting elements without length compensation of the respective connecting element to a respective one of the load-side fasteners the drive-side fastener and the respective load-side fastener that is coupled thereto by the respective connecting element being angularly offset to the drive-side rotation axis by 80° to 100°, the connecting elements being twistable in such a manner that its one end connected at a drive-side fastening point to the respective drive-side fastener is rotatable about a longitudinal center axis of the connecting element relative to the other end that is connected to a load-side fastening point of the respective load-side fastener.

26. The coupling according to claim 25 wherein each drive-side fastener and the respective low-side fastener coupled to it by the respective connecting element are angularly offset relative to the drive-side axis by 85° to 95°.

27. The coupling according to claim 25 wherein each drive-side fastener and the respective low-side fastener coupled to it by the respective connecting element are angularly offset relative to the drive-side axis by substantially 90°.

28. A coupling for transmitting torque from a drive element to a driven element, the coupling comprising:
   a drive-side connector rotatable about a drive-side axis,
   a plurality of drive-side fasteners spaced angularly on the drive-side connector about the drive-side rotation axis
   a load-side connector rotatable about a load-side axis,
   a plurality of load-side fasteners spaced angularly on the load-side connector about the load-side axis,
   a plurality of connecting elements each having a pair of opposite ends,
   respective swivel joints, each connected without length compensation between a respective one of the drive-side fasteners and a respective one of the one ends of the connecting links,
   respective swivel joints each connected without length compensation between a respective one of the load-side fasteners and a respective one of the other ends of the connecting links, the ends of each connecting element angularly offset relative to the drive-side rotation axis by 80° to 100°, the swivel joints each comprising a pivot bearing allowing rotation only about one pivot bearing axis and/or a self-aligning roller bearing and/or a self-aligning ball bearing.

29. The coupling according to claim 28 wherein each drive-side fastener and the respective low-side fastener coupled to it by the respective connecting element are angularly offset relative to the drive-side axis by 85° to 95°.

30. The coupling according to claim 28 wherein each drive-side fastener and the respective low-side fastener coupled to it by the respective connecting element are angularly offset relative to the drive-side axis by substantially 90°.

* * * * *